(12) United States Patent
Raj

(10) Patent No.: US 11,745,707 B2
(45) Date of Patent: Sep. 5, 2023

(54) INDIVIDUALIZED DYNAMIC ELECTRIC TRAIN BRAKING

(71) Applicant: US Department of Transportation, Washington, DC (US)

(72) Inventor: Phani Krishnaswamy Raj, Burlington, MA (US)

(73) Assignee: The United States Department of Transportation Federal Railroad Administration, Washington, DC (US)

( * ) Notice: Subject to any disclaimer, the term of this patent is extended or adjusted under 35 U.S.C. 154(b) by 835 days.

(21) Appl. No.: 16/411,580

(22) Filed: May 14, 2019

(65) Prior Publication Data
US 2020/0361433 A1    Nov. 19, 2020

(51) Int. Cl.
| | |
|---|---|
| B60T 8/18 | (2006.01) |
| B60T 8/32 | (2006.01) |
| B61H 13/30 | (2006.01) |
| B60T 8/17 | (2006.01) |
| B61H 11/00 | (2006.01) |

(52) U.S. Cl.
CPC .......... *B60T 8/3235* (2013.01); *B60T 8/1705* (2013.01); *B60T 8/1893* (2013.01); *B61H 11/005* (2013.01); *B61H 13/30* (2013.01); *B60T 2250/00* (2013.01)

(58) Field of Classification Search
CPC .... B60T 8/3235; B60T 8/1705; B60T 8/1893; B60T 2250/00; B61H 11/005; B61H 13/30
See application file for complete search history.

(56) References Cited

U.S. PATENT DOCUMENTS

| | | | |
|---|---|---|---|
| 2014/0277859 A1* | 9/2014 | Morris | B61L 23/34 701/19 |
| 2019/0168728 A1* | 6/2019 | Venkatasubramanian | B61C 17/12 |
| 2020/0156604 A1* | 5/2020 | Liu | B60L 7/00 |

\* cited by examiner

*Primary Examiner* — Truc M Do
(74) *Attorney, Agent, or Firm* — Charles R Ducker, Jr.

(57) ABSTRACT

A system and method for reducing the threat of derailment of a train during deceleration is provided. An individualized braking force for each rail car of a train, such individualized braking force being determined by the braking deceleration of the train's locomotive, may be calculated by the rail car's controller and is directly proportional to the mass of the rail car. The controller may utilize the various forces acting upon the individual rail car as measured by a plurality of sensing and measuring devices to dynamically adjust the braking force applied to the individual rail car's brakes. Such a system and method allows for the train to act as a single body mass when decelerating to eliminate rail car pile-up and reduce the threat of derailment.

20 Claims, 8 Drawing Sheets

INDIVIDUALIZED DYNAMIC ELECTRIC TRAIN BRAKING

STATEMENT OF GOVERNMENT INTEREST

The conditions under which this invention was made are such as to entitle the Government of the United States under paragraph 1(a) of Executive Order 10096, as represented by the Secretary of the Transportation, ownership of the entire right, title and interest hereto.

BACKGROUND OF THE INVENTION

1. Field of the Invention

The present disclosure relates generally to systems and methods for the individualized, simultaneous, dynamic braking of train cars.

2. Technical Background

Almost all the world's trains are equipped with braking systems which use compressed air as the force to push brake shoes onto the wheels or pads onto discs. These systems are known as "air brakes" or "pneumatic brakes." The compressed air is provided throughout the train through a "brake pipe" or a "train line" running from the locomotive to each individual rail car in the train.

In a simplified system, air is drawn into a compressor on the locomotive and stored in a main reservoir at a predefined pressure. This main reservoir is typically located on the locomotive, but can be located elsewhere on the train, such as a locomotive tender car. Compressed air from the main reservoir is distributed to each individual rail car from the reservoir through the brake pipe or train line. On each rail car, the train line is connected through a triple valve to an auxiliary reservoir which stores air for use by that rail car's individual brake system. The flow of air between the auxiliary reservoir and the brake cylinders is controlled through the triple valve or "distributor." Control of the distributor in each individual rail car is achieved by varying the pressure in the brake pipe, which is connected directly to the train engineer's brake control valve in the driver's cab of the locomotive. The default condition of brakes on all rail cars is the "not applied" condition. Decreasing the pressure in the brake pipe either through intentional action of the train engineer or through a complete or even partial loss of pressure in the brake pipe or train line causes the individual rail car brakes to apply. Increasing pressure in the brake pipe or train line causes the individual rail car brakes to release.

Current pneumatic braking systems, however, suffer from two issues that may unnecessarily lead to car pile-up, which could lead to derailment. Both issues stem from the fact that the signal for braking originates from the locomotive in the form of a pressure reduction in the brake pipe.

The first of these issues is the time delay for initiation of the braking system of each individual rail car in a train. The pressure reduction signal in the brake pipe travels at or close to the speed of sound, approximately 300 m/s at sea level. In freight trains, particularly those scheduled for cross-country transit, there may exist consists of 100 or more individual rail cars, where the train length may be 2 or more kilometers. In such a train, the last rail car does not receive the braking signal from the locomotive through the pressure reduction in the brake pipe for approximately 7 seconds. Additional delays of several seconds may occur owing to the mechanical action of the brake shoes contacting the wheels of their respective rail car. Such delays and the sequential nature of the brake application results in the trailing rail cars remaining in motion long after the leading rail cars have begun decelerating or having even stopped. This aspect of train braking results in rail car pile-up and possible derailment. Often it is the physical force of a stopped preceding rail car that physically stops a trailing rail car, putting significant structural stress on both cars and the coupler between them.

The second issue is the application of each individual rail car's brakes at approximately the same stopping force regardless of the rail car's mass. This results in differing deceleration rates for each individual rail car—an empty rail car will decelerate quicker than a fully laden rail car under the same braking force. Put another way, this type of constant force braking is inherently unbalanced and may lead to uneven variations in rail car speeds during a braking operation. Such uneven braking can lead to rail car pile-up and potential derailment, particularly in situations in which larger mass rail cars are located behind lighter mass rail cars in a train and/or in emergency braking operations.

SUMMARY OF THE INVENTION

Aspects and advantages of embodiments of the present disclosure will be set forth in part in the following description, or may be learned from the description, or may be learned through practice of the embodiments.

An exemplary system and method for the near-simultaneous and dynamically proportional braking of individual rail cars of a train such that a train may stop as a single construct are provided in accordance with one embodiment of the present disclosure. Such exemplary system may replace the pneumatic braking system and its operation so that each individual rail car in a train responds to a braking signal by applying a braking force specific to that individual rail car. Individualized braking forces for each rail car may be dynamically calculated based on the mass of the rail car, the required deceleration rate, the local track grade, the rail-to-wheel frictional force, the forces at the couplers, and a continuous measurement of the individual rail car's acceleration/deceleration.

Additionally, the exemplary system may include an electronic signal generator electrically coupled. to the train engineer's brake valve for providing a brake demand signal to be transmitted to each car nearly simultaneously. Such system may include an electronic receiver suitable for detecting the brake demand signal and initiating the desired activation of the brakes in each individual rail car. In activating the rail cars brakes, the exemplary system may further include additional measurement devices, a power supply, a controller, and an electro-mechanical actuator to allow for the determination and application of a braking force proportional to the mass of the individual rail car and the requested deceleration rate. Such a proportional response ensures that all rail cars of a train reduce speed at the same rate.

An exemplary method of operation for the system may include the dynamic determination of the mass of each individual car in the train using the exemplary devices during the train's motion. Also, the exemplary method of operation of the system at the time of brake application may include the initiation of the system by the transmission of a deceleration signal from the electronic signal generator of the locomotive to each individual rail car receiver. Both wired and wireless transmission of the deceleration signal are contemplated in the various embodiments of the present disclosure. Within each individual rail car, an onboard controller may determine the speed and stroke length of the plunger of the electric braking system to apply the proper braking force on the wheels based on the magnitude of deceleration indicated by the deceleration signal received, as well as the calculated mass of the individual rail car and the local track gradient.

An electro-mechanical actuator may serve to initiate movement of the brake shoe and application linkage in the braking system serving its respective rail car at the predetermined rate of movement and stroke length calculated by the rail car's controller to accomplish the deceleration indicated by the locomotive's signal. The rail car's controller may serve to sample the deceleration rate of its respective rail car at a high sampling rate. Adjustments to the rail ear's deceleration rate necessary to make it correspond to the deceleration rate signaled by the locomotive can be achieved by dynamically varying plunger force and stroke of the rail car's braking system. The dynamic variation of each rail car's braking force allows the train to behave as a single body mass without rail car bunching, thus reducing the threat of derailment.

These and other features, aspects and advantages of the present invention will become better understood with reference to the following description and the appended drawings and claims. The accompanying drawings, which are incorporated in and constitute a part of this specification, illustrate embodiments of the present disclosure and together with the description, explain the related principles.

BRIEF DESCRIPTION OF THE DRAWINGS

A detailed discussion of embodiments directed to one of ordinary skill in the art are set, forth in this disclosure, which refers to the appended figures, in which.

Figure 1:
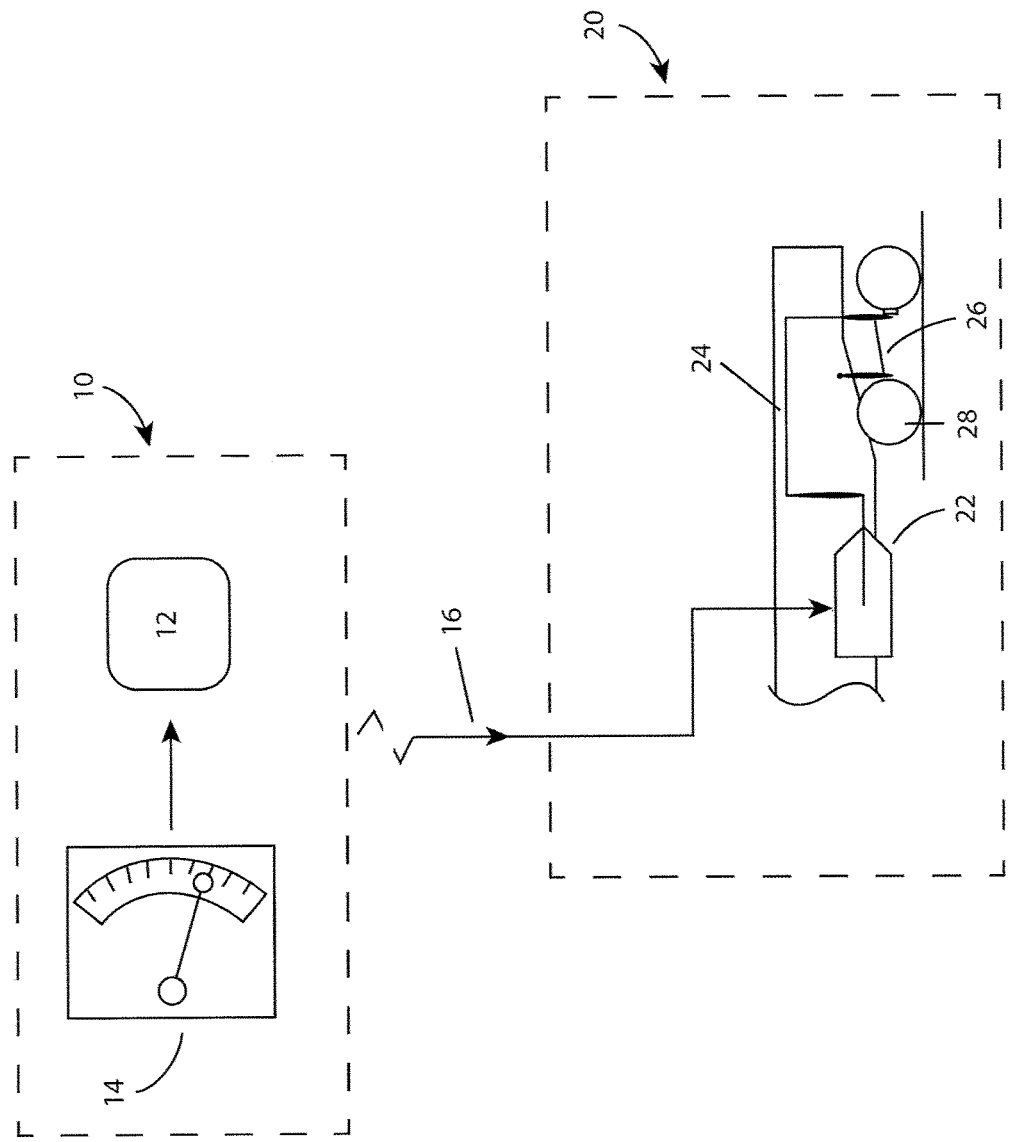
FIG. 1 illustrates a detailed view of a known pneumatic braking system.

Repeat use of reference characters throughout the present disclosure, including the appended drawings, is intended to represent the same or analogous features or elements.

DETAILED DESCRIPTION OF THE PREFERRED EMBODIMENTS

Reference will now be made in detail to embodiments, one or more examples of which are illustrated in the drawings. Each example is provided by way of an explanation of the embodiments, not limitation of the present disclosure. In fact, it will be apparent to those skilled in the art that various modifications and variations can be made to the embodiments without departing from the spirit and scope of the present disclosure. For instance, features illustrated or described as part of one embodiment can be used with another embodiment to yield a still further embodiment. Thus, it is intended that the present disclosure cover such modifications and variations.

As depicted in FIG. 1, a known pneumatic braking system provides a brake signaling and activation system for use on a train is provided. On the locomotive 10 there may be provided a main air reservoir 12 in fluid communication with the train engineer's main brake actuating lever and valve 14. The main brake actuating lever and valve 14 serves to modify the pressure in the brake pipe 16, a continuous air hose running the length of the train. A change in the position of the main brake actuating lever and valve 14 modifies the pressure in the brake pipe 16. Normally, a decrease in the pressure of the brake pipe 16 serves to activate the pneumatic braking system on each individual rail car 20 to slow the train as a plurality of multiple connected vehicles.

In such known system, the change in pressure in the brake pipe 16 directly triggers the piston operated mechanical actuator and linkage 22 and 24 of the individual rail car's onboard braking system to initiate either a braking or non-braking action. As indicated above, typically, a decrease in pressure triggers a braking action, wherein the mechanical linkage 24 actuates the brake shoes 26 to engage the wheels 28 of the rail car to slow the rail car 20. Alternatively, an increase in the pressure in the brake pipe 16 triggers the electro-mechanical actuator 22 and mechanical linkage 24 of an individual rail car's braking system to release the brake shoes 26 from the wheels 28 of the rail car 20.

Figure 2:
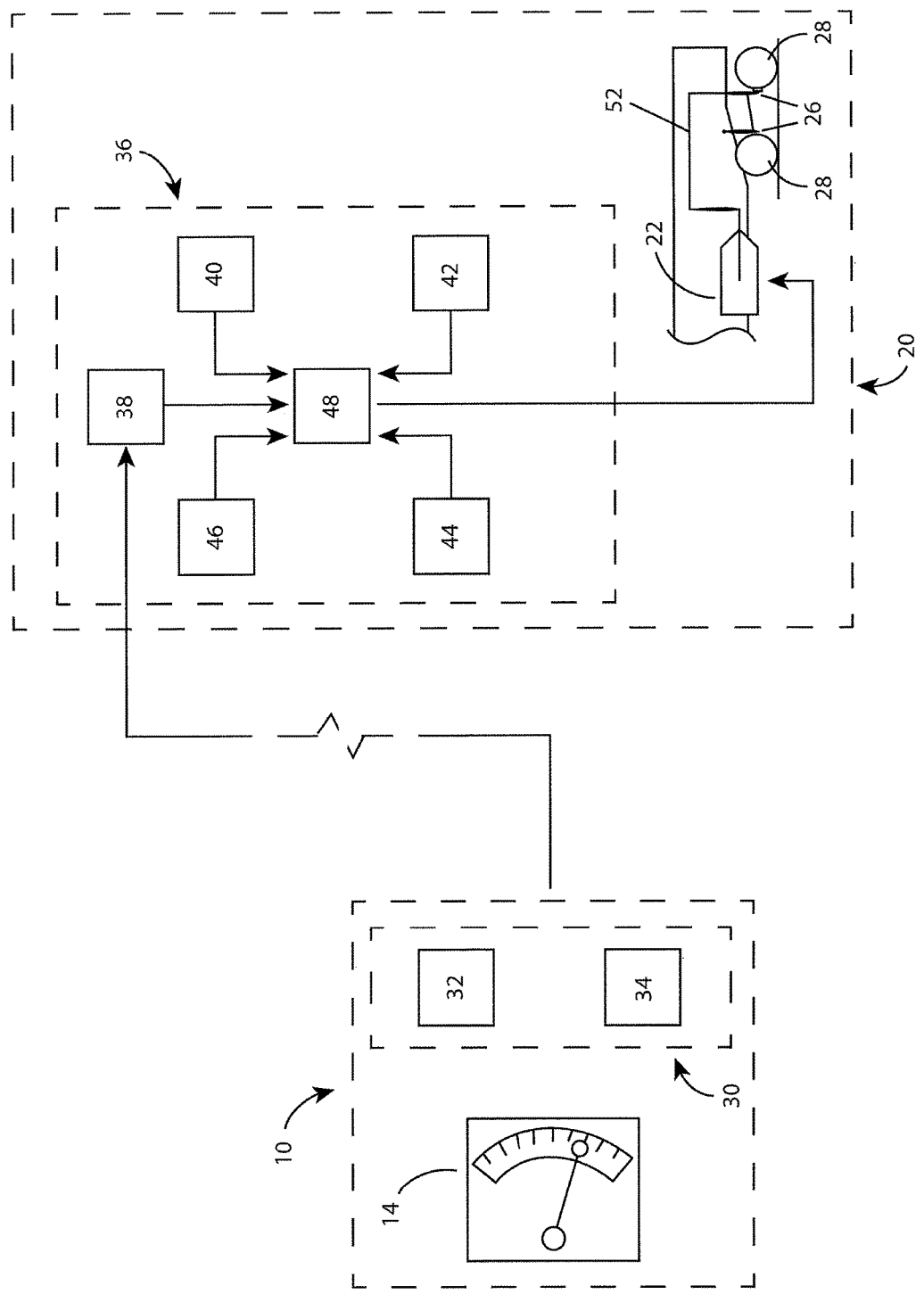
FIG. 2 illustrates a detailed view of one exemplary embodiment of an electric braking system in accordance with the present disclosure.

FIG. 2 shows an exemplary embodiment of a system for electronic braking of a train in accordance with the present disclosure. The initiation of a train braking action begins with the manipulation by the train engineer of the main brake actuating lever 14 on the locomotive 10. There may be provided on the locomotive 10 a measurement and transmission subsystem 30 in electrical communication with the main brake actuating lever 14. This subsystem 30 may be comprised of at least one accelerometer 32 for measurement of the locomotive's acceleration/deceleration and a transmitter 34 for providing such measurement to each individual rail car 20. The transmission of the locomotive measurement can be accomplished in a number of ways as will be discussed below.

To reduce the incidents of rail car pile-up and thus reduce the possibility of train derailment, the present disclosure provides on each individual rail car 20 a modified brake activation subsystem 36. Such a subsystem 36 in coordination with the locomotive measurement and transmission subsystem 30 may serve to slow the train as a coordinated single unit regardless of differences in the mass of each car, the local track gradient, or other factors that would affect the otherwise independent deceleration of each individual rail car 20 in a train braking operation.

The modified braking subsystem 36 may include a receiver 38 for receipt of a deceleration signal from transmitter 34 as calculated by accelerometer 32 on the locomotive 10. Sensors and measuring devices, including a rail car accelerometer 40, strain gages on the leading 42 and trailing 44 couplers of the rail car, and a device for measuring the local track gradient 46 may be located on each individual rail car 20. A controller 48 suitable for activation by the receiver 38 and the multiple sensor and measuring devices (40, 42, 44, & 46) onboard the individual rail car 20 may perform individual rail car specific brake force calculations. Each rail car 20 may be provided an electro-mechanical actuator 22 in electrical connection with controller 48 and in mechanical connection with an electro-mechanical plunger 52. Specifically, the controller 48 may calculate the specific application rate and stroke length of the electro-mechanical plunger 52 of the rail car's local braking system. When controller 48 calculates the specific application rate and stroke length parameters, it may activate plunger 52 of the local rail car braking system to ensure that the individual rail car 20 decelerates at a rate as close or equal to that of the locomotive 10. In this manner, the train decelerates as a single unit with each rail car 20 decelerating at the same rate.

Figure 3:
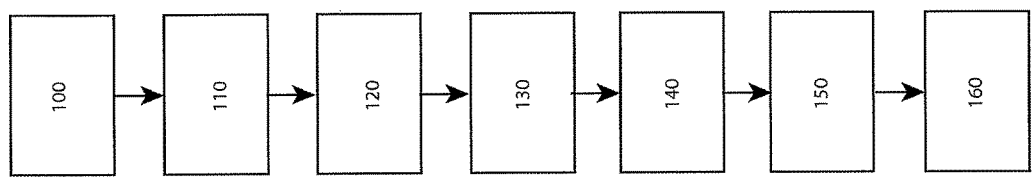
FIG. 3 illustrates a flowchart of one exemplary method of the present disclosure.

As shown in FIG. 3, one exemplary embodiment of a method for the near-simultaneous, dynamic, electric braking of all rail cars of a train as a single unit in accordance with the present disclosure is provided. A braking operation is initiated 100 by the alteration of the locomotive's main brake actuation lever 14 by the train engineer. An accelerometer 32 on the locomotive may serve to measure 110 the acceleration/deceleration of the locomotive 10. The accelerometer 32 may send the measured value to a transmitter 34, which may transmit 120 to each rail car 20. Alternatively, the locomotive 10 and all individual rail cars 20 may be connected by a continuous electrical cable that may serve to transmit the measured locomotive acceleration/deceleration. The measurement 110 and transmission 120 of the locomotive's acceleration/deceleration rate may occur at a frequency sufficient to ensure the dynamic and near-simultaneous braking of all rail cars within a train such that the train brakes as a single mass unit instead of a collection of individual rail cars.

On each individual rail car, the receiver 38 may receive 130 the transmitted locomotive acceleration/deceleration rate and provide it to the local controller 48. Each of the sensors and measuring devices (40, 42, 44, & 46) on each individual rail car 20 may serve to measure 140 the acceleration/deceleration rate, local coupler forces, and local track gradient and provide that information to the local controller 48, respectively. Local controller 48 may serve to calculate 150 the application rate and stroke length for the plunger 52 of the local rail car braking system, which it may provide to electro-mechanical actuator 22. Actuator 22 may serve to initiate or adjust 160 the local braking system as appropriate to match the deceleration of the rail car 20 with that of the locomotive 10. Method steps 130-160 on each individual rail car may be repeated at a rate at least equal to the rate of measurement of the acceleration/deceleration of the locomotive.

Figure 4:
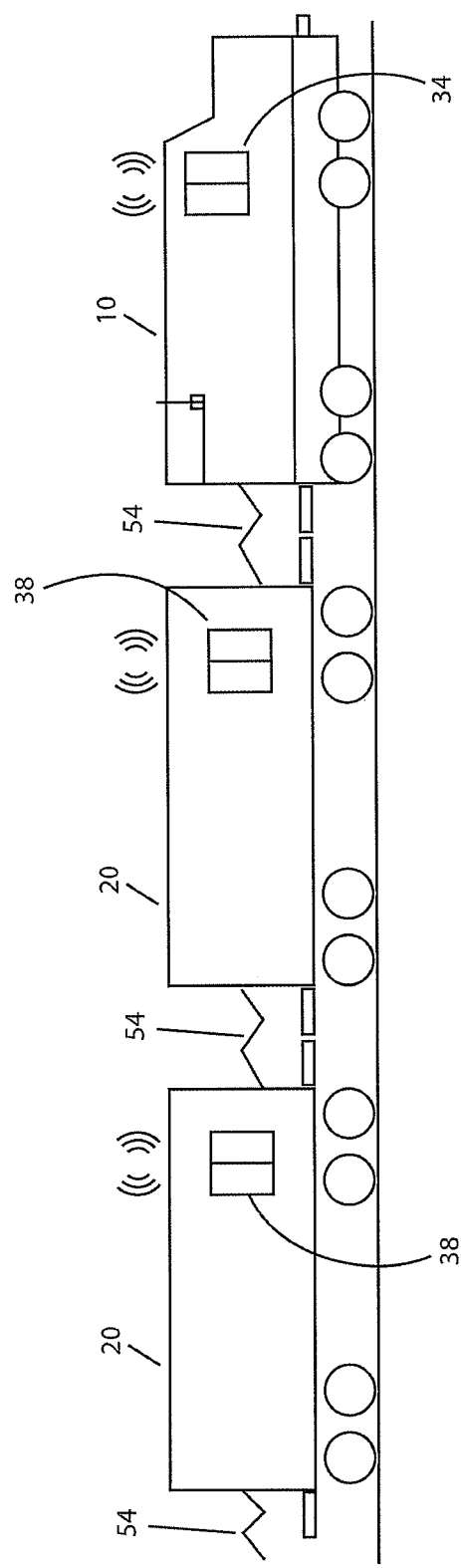
FIG. 4 illustrates one exemplary signal propagation methodology for the deceleration signal in accordance with the present disclosure.

FIG. 4 depicts an aspect of the measurement and transmission subsystem 30 of the locomotive 10. As indicated above, the measured deceleration rate of the locomotive 10 is transmitted to each individual rail car 20. The present disclosure envisions a variety of ways in which this can occur. One such method involves the use of an electrical data cable 54 running the length of the train. Such a data cable 54 can be secured and run next to other lines running generally under each rail car 20 and across the couplings between individual rail cars 20. Alternatively, locomotive transmitter 34 may utilize radio frequency transmissions to simultaneously provide all the individual rail car controllers 48 the locomotive's deceleration rate. Use of radio as the means of transmitting the locomotive's deceleration rate requires each rail car to be provided with a receiver 38 suitable for communication by a radio frequency (RF) signal. Alternatively, each car can be provided both a receiver and transmitter (e.g., a transceiver) 38 suitable for both receiving and re-transmitting radio frequency (RF) communications received from the locomotive 10. As such, each rail car can receive from either the locomotive 10 or from another rail car's transceiver 38 the measured deceleration rate of the locomotive 10. In this alternative arrangement, RF communication can be error free irrespective of long distance RF transmission complications in very long trains or due to other RF obstructions such as blind spots due to curves, tunnels, or weather.

In operation, the local controller 48 on each rail car 20 serves to accept and utilize the sensor inputs and measured parameters that directly affect the calculation of the necessary braking force for its respective rail car 20. FIGS. 5-8 depict various forces that may be operating on an individual rail car during operation of an exemplary embodiment of the present disclosure. The remainder of this disclosure will be used to explain the calculations carried out by each rail car controller 48 to determine the necessary net braking force needed for that individual rail car's braking system to ensure that the rail car 20 decelerates at the same rate as the locomotive 10.

Figure 5:
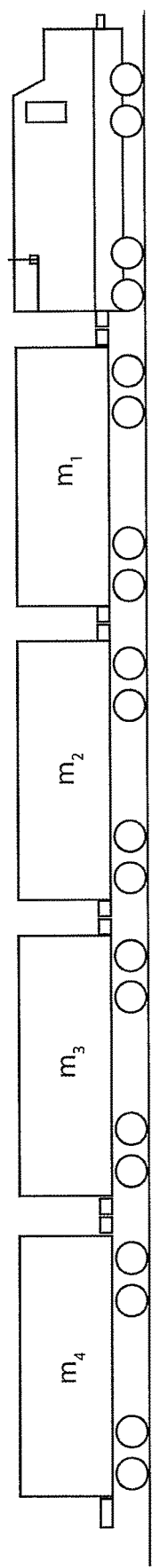
FIG. 5 illustrates an exemplary train comprising multiple rail cars each having a different mass and traveling on a zero-gradient track.

A train with several railcars, each having differing masses, m1, m2, m3, etc., and a train moving at a constant speed is shown in FIG. 5. In one exemplary method of the present disclosure, the train engineer in the locomotive 10 may initiate a braking event, quantified by either a constant or time-varying deceleration of the locomotive, as measured by locomotive accelerometer 32. For the entire train to act as a single unit throughout its deceleration, it is necessary for each rail car's deceleration rate or change in velocity over time be equal to the deceleration rate of the locomotive 10. Deceleration is the negative acceleration of an object, as defined by the equation:

$$\text{Acceleration} = a = dU/dt$$

$$\text{Deceleration} = -a = -dU/dt$$

where U is the velocity at any given time of the object and t is the time.

Figure 6:
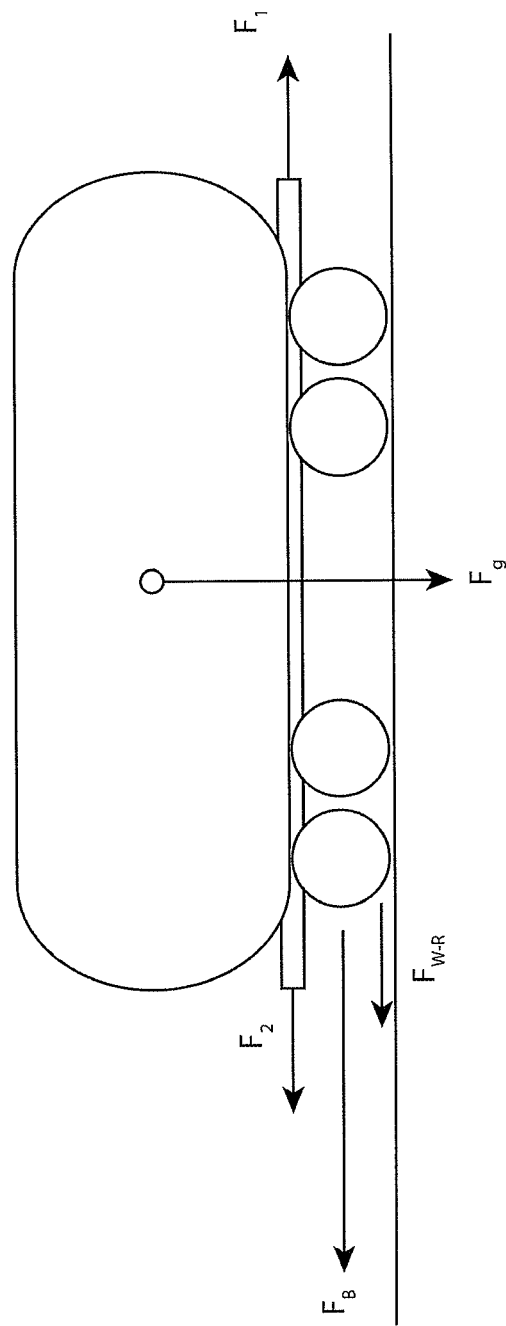
FIG. 6 illustrates a detailed view of some of the forces acting on an individual rail car on a zero-gradient track.

As best seen in FIG. 6, there are numerous forces acting on each individual rail car 20. In the case of a rail car 20 moving at a constant speed U on a zero-gradient track, such forces include the weight of the car, $F_g$, the forces acting at the forward and rear couplers, $F_1$ and $F_2$, and the wheel-to-rail frictional force, $F_{W-R}$. For a constant speed train rolling on a zero-gradient track with the same coefficient of wheel-to-rail friction, $\mu$, and with no brake force $F_B$ applied the longitudinal forces acting on each rail car are typically balanced. In other words, the following force equilibrium equations hold true:

$$F_1 = F_2 + F_{W-R}$$

$$F_{W-R} = \mu F_g = \mu m\, g$$

where g is the acceleration of the train's mass in the vertical direction due to gravity. $F_g$ is also called the "weight" of the individual rail car 20, and $$\text{Net Braking Force} = F_B = 0$$

The net braking force equals zero because the other forces on the rail car are balanced and the train is moving at a constant speed thus the deceleration, the change in speed over a given period, is zero.

Figure 7:
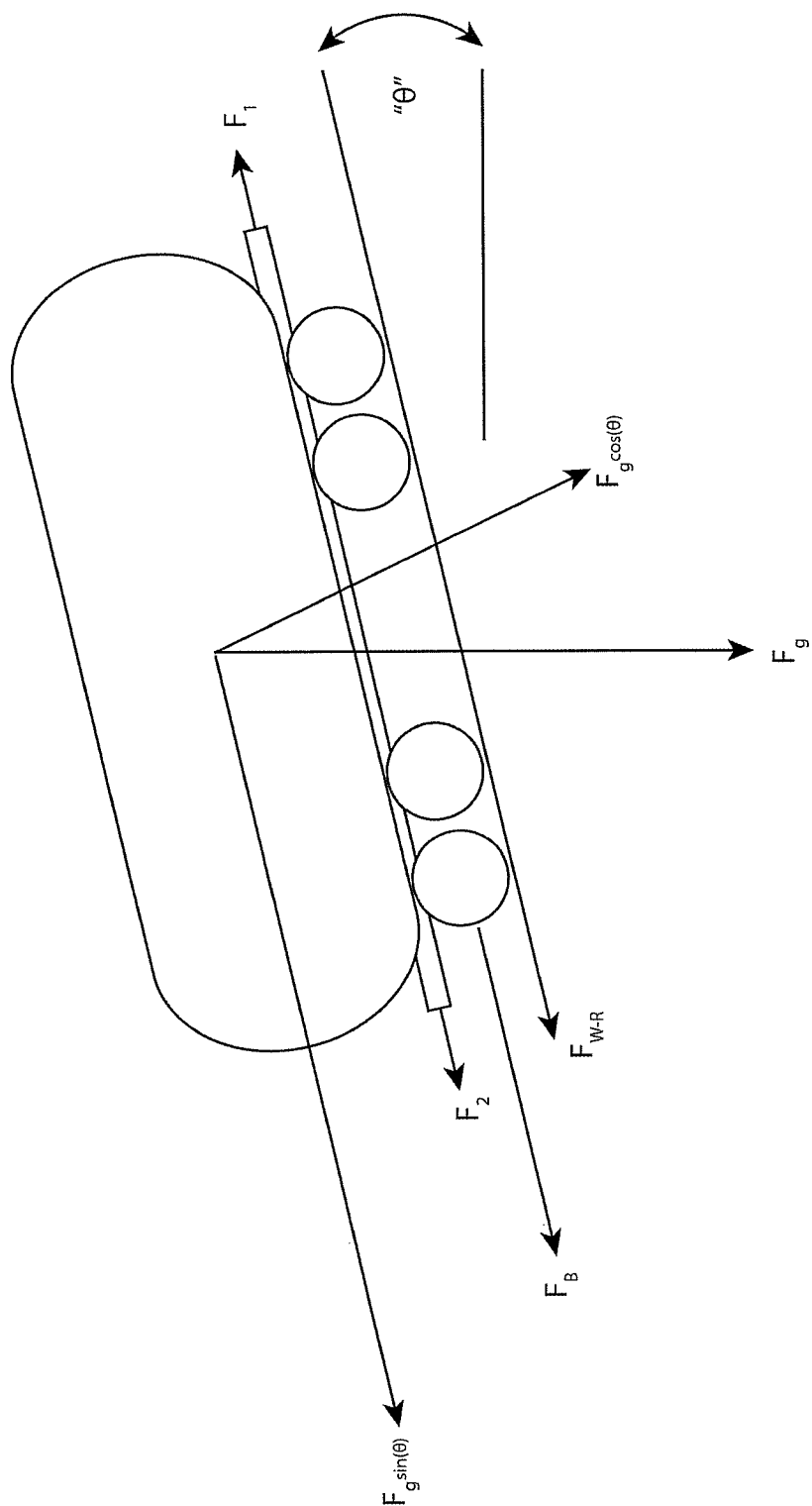
FIG. 7 illustrates a detailed view of some of the forces acting on an individual rail car moving on a positive gradient track.

As shown in FIG. 7, where the speed remains constant and no brake applied, but the track gradient becomes positive (i.e., the train is moving uphill), the equations change to accommodate the increased impact of gravity acting against the train's constant speed. The above equilibrium equations become:

$$FB = 0 \text{(No braking force)}$$

$$(F_1 - F_2) = F_{W-R} + m\, g\, \sin(\theta)$$

$$F_{W-R} = \mu F_g \cos(\theta) = \mu m\, g \cos(\theta)$$

Figure 8:
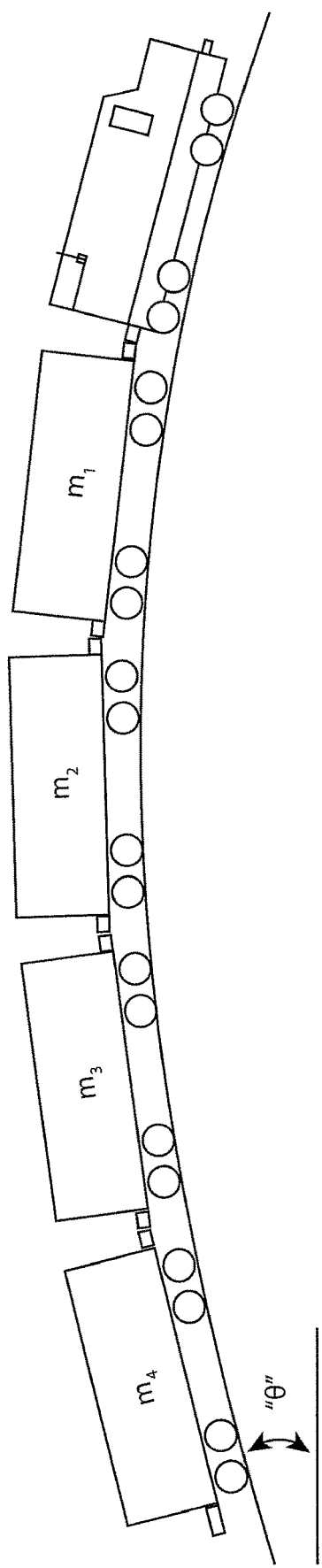
FIG. 8 illustrates a train moving on a varying gradient track.

Finally, FIG. 8 shows a scenario in accordance with one embodiment of the present disclosure in which individual rail cars 20 experience differing local gradients, some positive and some negative, at the moment of determining the braking force needed by each individual rail car 20 within a train to equal the deceleration of the locomotive. At any given moment in time assuming a constant rate of deceleration by the locomotive, the equilibrium equation for each rail car 20 becomes:

$$\text{Net Braking Force, } F_B = (F_1 - F_2) - F_{W-R} - m\, g\, \sin(\theta) + m(-a)$$

where $$F_{W-R} = \mu m \cos(\theta)$$

or $$|F_B| = (F_1 - F_2) - F_{W-R} - m(a + g\, \sin(\theta))$$

or $$|F_B| = (F_1 - F_2) - F_{W-R} - m[a \leftrightarrows g(\mu \cos(\theta(+ \sin g(\theta))]$$

It should be noted that the calculation of the mass of each rail car and the wheel-to-rail coefficient of friction can be accomplished using the above equation, the other measured parameters, and a least square fit algorithm for determining two unknown parameters. The equation becomes, when no brake is applied and with measured acceleration and coupler forces:

$$m = (F_1 - F_2)/[a + g(\sin(\theta) + \mu \cos(\theta))]$$

The mass of an individual car can be inferred, dynamically, by measuring the acceleration, coupler forces and local gradient and using the above equation. This process provides an accurate value of the current mass of each car whose value is stored in local controller 48. In addition, this procedure negates the requirement for weighing each car on a scale and providing the weight scale number to the controller. This dynamically calculated mass of each individual car may then be used by local controller 48 to provide the proper instructions to electro-mechanical actuator 22 to ensure that the deceleration rate of the individual car 20 is the same as that of the locomotive 10.

While the present subject matter has been described in detail with respect to specific example embodiments and methods thereof, it will be appreciated that those of ordinary skill in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

I claim:

1. A dynamic electronic braking system for a train construct, comprising:
a locomotive braking system suited to measure and transmit said locomotive's deceleration to each of a plurality of individual rail cars in said train construct;
a plurality of individual rail car braking systems, each suited to receive said transmitted locomotive deceleration and to dynamically calculate a proportional braking force based on forces acting on said individual rail car, a local gradient to which said individual rail car is subject, and a dynamically measured mass of said individual rail car; and
wherein each of said plurality of individual rail car braking systems is suited to dynamically vary said proportional braking force throughout a single braking event such that said train construct slows and stops as a single mass body based on multiple of said received locomotive deceleration rates, said forces acting on said individual rail car, a local gradient at said individual rail car, and said dynamically measured mass of said individual rail car.

2. The dynamic electronic braking system of claim 1, wherein said locomotive braking system comprises:
an accelerometer for measuring the deceleration of said locomotive; and
a transmitter for transmitting said measured deceleration of said locomotive to each of said plurality of individual rail car braking systems.

3. The dynamic electronic braking system of claim 1, wherein each of said individual rail car braking systems comprise:
a rail car brake activation system;
an electro-mechanical actuator;
a power supply suitable to energize said electro-mechanical actuator;
a plunger;
brake shoes;
wherein said electro-mechanical actuator is in electrical communication with said rail car brake activation system; and
wherein said electro-mechanical actuator drives said plunger a stroke length and stroke rate proportional to the deceleration of said locomotive such that said train construct slows and stops as a single mass body.

4. The dynamic electronic braking system of claim 3, wherein each of said individual rail car braking activation systems comprise:
a receiver for electronic receipt of said measured deceleration of said locomotive;
a plurality of sensors for measuring the forces acting on said individual rail car; and
a controller for performing specific brake force calculations including calculating said plunger stroke length and stroke rate for its associated individual rail car.

5. The dynamic electronic braking system of claim 4, wherein said plurality of sensors comprise:
an accelerometer;
a strain gauge on each of a leading and trailing coupler of each of said individual rail cars;
a device for measuring said local gradient to which said individual rail car is subject; and
wherein said controller dynamically calculates the mass of said individual rail car.

6. The dynamic electronic braking system of claim 2, wherein each of said individual rail car braking activation systems comprises:
a transceiver for electronic receipt of said measured deceleration of said locomotive;
a plurality of sensors for measuring forces acting on said individual rail car; and
a controller for dynamically performing specific brake force calculations for its associated individual rail car.

7. The dynamic electronic braking system of claim 6, wherein said plurality of sensors comprise:
- an accelerometer;
- a strain gauge on each of a leading and trailing coupler of each of said individual rail car;
- a device for measuring said local gradient to which said individual rail car is subject; and
- wherein said controller dynamically calculates the mass of said individual rail car.

8. The dynamic electronic braking system of claim 7, wherein said transceiver in each of said individual rail car braking systems re-transmits said measured deceleration of said locomotive to ensure error free communication to all individual rail cars.

9. A dynamic electronic braking system for a train construct, comprising:
- a main brake actuating lever in electrical communication with a braking system of a locomotive;
- wherein said locomotive braking system includes a measurement and transmission system comprising an accelerometer for measuring the deceleration of said locomotive and a transmitter for electronically transmitting said measured deceleration of said locomotive to each of a plurality of individual rail cars in said train construct;
- a plurality of individual rail car braking systems, each associated with one of said plurality of individual rail cars and each further comprising an individual rail car brake activation system;
- wherein each of said individual rail cars has a plurality of wheels and brakes;
- wherein each of said individual rail car brake activation systems includes a communication means for receipt of said measured deceleration of said locomotive, a plurality of sensors for measuring forces acting on said individual rail car in said train construct, and a controller for dynamically performing individual rail car specific braking force calculations;
- wherein each of said plurality of individual rail car brake activation systems are in electronic communication with an associated one of said individual rail car braking systems;
- wherein said controller dynamically calculates an individual rail car braking force based on said measurement of said deceleration of said locomotive, a measured instantaneous velocity of said individual rail car, a calculated individual rail car deceleration rate, a comparison of said individual rail car deceleration rate and said measured deceleration of said locomotive, said measured forces acting on said individual rail car, and a mass of said individual rail car; and
- wherein each of said plurality of individual rail car brake activation systems is suited to dynamically vary said proportional braking force throughout a single braking event such that said train construct slows and stops as a single mass body based on multiple received locomotive deceleration rates, said forces acting on said individual rail car, a local gradient at said individual rail car, and said mass of said individual rail car.

10. The dynamic electronic braking system of claim 9, wherein said communication means in each of said individual rail car brake activation systems is a transceiver suitable for receipt and re-transmission of said measured locomotive deceleration to each of said other plurality of individual rail cars to ensure error free communication between said locomotive and all of said plurality of individual rail cars.

11. The dynamic electronic braking system of claim 10, wherein said plurality of sensors includes:
- an accelerometer for measuring deceleration of said individual rail car;
- strain gauges located on each of a leading and trailing coupler of each of said individual rail cars;
- a device for measuring a local track gradient at said individual rail car; and
- wherein said controller dynamically calculates the mass of said individual rail car.

12. The dynamic electronic braking system of claim 11, wherein each of said individual rail car braking system further comprises:
- an electro-mechanical actuator in electrical communication with said controller of said individual rail car brake activation system and in mechanical communication with a plunger;
- wherein said controller dynamically calculates a stroke length and stroke rate for said plunger sufficient to decelerate said individual rail car at a rate appropriate to allow said train construct to decelerate as a single-mass body; and
- wherein said actuator drives said plunger which engages said individual rail car braking system's brakes to engage with said individual rail car's plurality of wheels.

13. The dynamic electronic braking system of claim 9, wherein each of said individual rail car braking system further comprises:
- an electro-mechanical actuator in electrical communication with said controller of said individual rail car brake activation system and in mechanical communication with a plunger;
- wherein said controller dynamically calculates a stroke length and stroke rate for said plunger sufficient to decelerate said individual rail car at a rate appropriate to allow said train construct to decelerate as a single-mass body; and
- wherein said actuator drives said plunger which engages said individual rail car braking system's brakes to engage with said individual rail car's plurality of wheels.

14. The dynamic electronic braking system of claim 13, wherein said plurality of sensors includes:
- an accelerometer for measuring the deceleration of said individual rail car;
- strain gauges located on each of a leading and trailing coupler of each of said individual rail cars;
- a device for measuring a local track gradient at said individual rail car; and
- wherein said controller dynamically calculates the mass of said individual rail car.

15. The dynamic electronic braking system of claim 9, wherein each of said individual rail car braking systems further comprises:
- an accelerometer for measuring the deceleration of said individual rail car;
- strain gauges located on each of a leading and trailing coupler of each of said individual rail car;
- a device for measuring a local track gradient at each individual rail car; and
- wherein said controller dynamically calculates the mass of said individual rail car.

16. A dynamic electronic braking system for a train construct, comprising:
- a braking system for a locomotive;
- a plurality of individual rail car braking systems;

wherein said locomotive braking system dynamically measures and electronically communicates a measured deceleration of said locomotive to each of said plurality of individual rail car braking systems;

wherein each of said plurality of rail cars includes a plurality of wheels and brakes;

wherein each of said plurality of individual rail car braking systems further comprises a plurality of sensors for measuring forces acting upon said individual rail car, a controller for receipt of said measured deceleration of said locomotive and said plurality of measured forces acting on said individual rail car;

wherein said controller dynamically calculates a proportional braking force for said individual rail car; and wherein each of said plurality of individual rail car braking systems is suited to dynamically vary said proportional braking force throughout a single braking event such that said train construct slows and stops as a single mass body based on multiple said received locomotive deceleration rates, said forces acting on said individual rail car, a local gradient at said individual rail car, and a dynamically measured mass of said individual rail car.

17. The dynamic electronic braking system of claim 16, wherein each of said controllers further comprises a transceiver for receipt and re-transmission of said measured deceleration of said locomotive to ensure error free communications between said locomotive and all other of said individual rail cars.

18. The dynamic electronic braking system of claim 17, wherein each of said rail car braking systems further comprises:
   an electro-mechanical actuator in electrical communication with said controller and mechanical communication with a plunger;
   wherein said controller dynamically determines a stroke length and stroke rate for said plunger to decelerate said individual rail car; and
   wherein said actuator drives said plunger to engage the individual rail car braking system's brakes to engage with said plurality of wheels of the individual rail car.

19. The dynamic electronic braking system of claim 16, wherein said locomotive braking system and each of said individual rail car braking systems are in electronic communication and wherein said measured deceleration of said locomotive is electrically communicated along a continuous cable running a full length of the train construct.

20. The dynamic electronic braking system of claim 16, wherein said locomotive braking system and each of said individual rail car braking systems are in electronic communication and wherein said measured deceleration of said locomotive is communicated by electromagnetic waves.

* * * * *